United States Patent [19]

Hayashi et al.

[11] Patent Number: 4,513,834
[45] Date of Patent: Apr. 30, 1985

[54] AGRICULTURAL TRACTOR

[75] Inventors: Tetsuaki Hayashi, Osaka; Masahiro Kabu, Kawachinagano; Nobuyuki Yamashita, Kitakyushu, all of Japan

[73] Assignee: Kubota, Ltd., Japan

[21] Appl. No.: 377,178

[22] Filed: May 11, 1982

[30] Foreign Application Priority Data

Jul. 31, 1981 [JP] Japan ............................ 56-115028[U]
Aug. 3, 1981 [JP] Japan ............................ 56-115923[U]

[51] Int. Cl.$^3$ ............................................. B60K 17/04
[52] U.S. Cl. ................................... 180/70.1; 180/900; 188/2 R
[58] Field of Search ............... 180/70 R, 70.1, 70 MS, 180/70.2, 75, 88, 900; 188/2 R

[56] References Cited

U.S. PATENT DOCUMENTS

| 2,287,438 | 6/1942 | Lindsay | 188/2 R |
| 2,340,134 | 1/1944 | Maxon et al. | 188/2 R |
| 2,805,743 | 9/1957 | Keese | 180/70.1 |
| 3,108,481 | 10/1963 | Westmont | 180/70.1 |
| 3,266,590 | 8/1966 | Hungerford | 180/70.1 |

FOREIGN PATENT DOCUMENTS

| 537601 | 5/1922 | France | 180/70.1 |
| 601398 | 3/1926 | France | 180/70.1 |

Primary Examiner—Joseph F. Peters, Jr.
Assistant Examiner—Ross Weaver
Attorney, Agent, or Firm—Cushman, Darby & Cushman

[57] ABSTRACT

A travelling transmission case and a differential transmission case are respectively connected to the upper and lower portions of a vertically long-shape speed reduction case. Thus, the distance between the lowest level of the travelling transmission case and the ground is increased.

6 Claims, 7 Drawing Figures

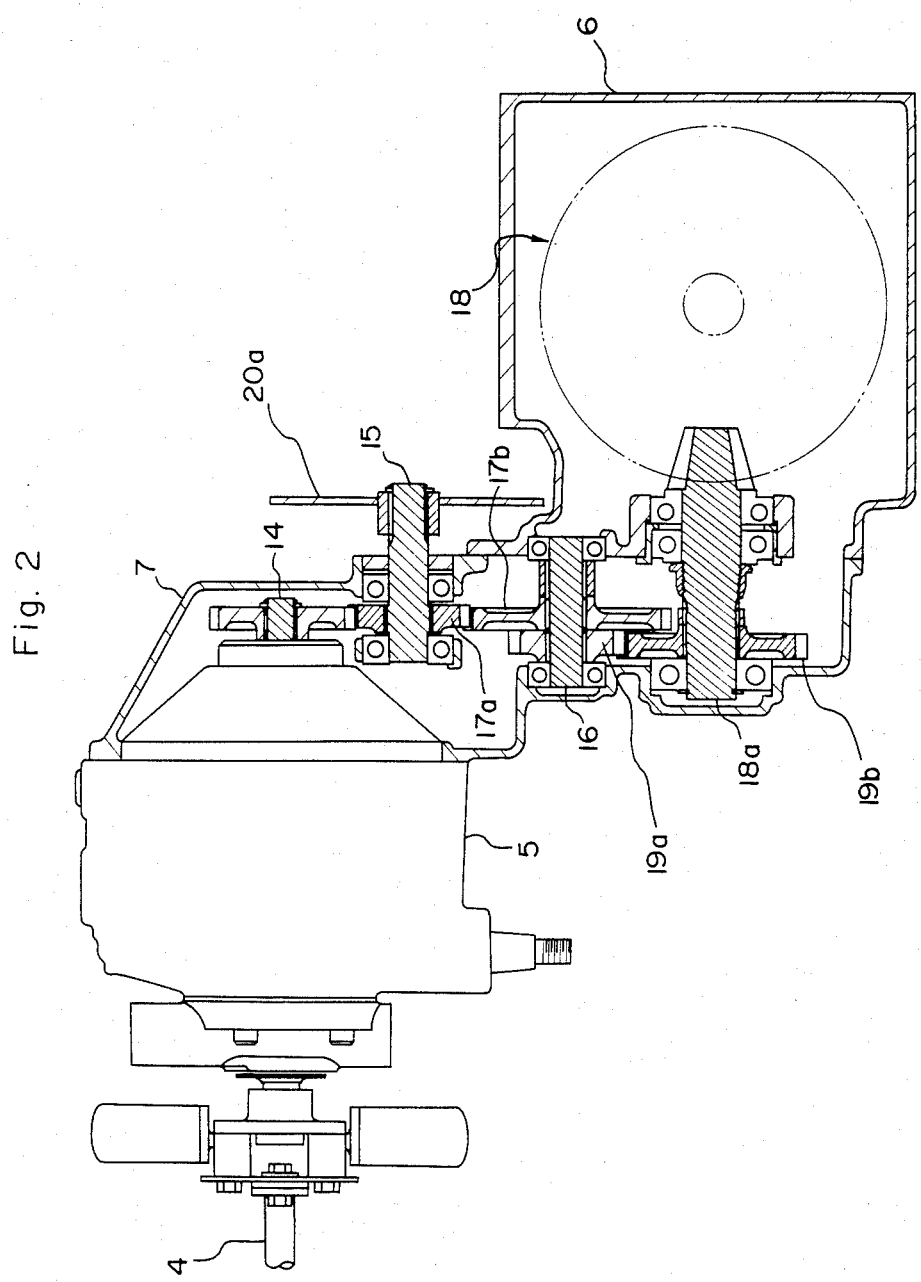

AGRICULTURAL TRACTOR

BACKGROUND OF THE INVENTION (1) Field of the Invention

The present invention relates to an agricultural tractor provided at the front thereof with an engine of which output shaft is disposed in the front-rear direction of the tractor, and at the rear thereof with a travelling transmission case to which output of the engine is transmitted through a shaft, a differential transmission case for driving the rear wheels and a speed reduction case for driving the rear wheels.

(2) Description of the Prior Art

As shown in FIG. 7, it is conventionally known an agricultural tractor of the type above-mentioned. According to such conventional tractor, a differential transmission case for driving the rear wheels 6' is connected to the rear of a travelling transmission case 5'. Speed reduction cases 7' are extended downwardly from the both lateral sides of the differential transmission case 6'. The rear wheels 12' are then respectively supported by the extended ends of the speed reduction cases 7'. As thus discussed, the speed reduction cases 7' are downwardly extended. This is because it is necessary to locate the transmission case 5' at a position sufficiently high from the ground in order to mount a working machine at the intermediate position between the front and rear wheels of the tractor.

However, since power is transmitted from the differential transmission case 6' to a pair of left and right rear wheels 12' through the speed reduction cases 7', a pair of speed reduction cases 7' and a pair of incorporated speed reduction gears are required correspondingly to the respective rear wheels 12'.

Moreover, it is structurally limited to improve, in a simple manner, the tractor such that the lowest level of the transmission case 5' is located at a position sufficiently high from the ground as above-mentioned.

On the other hand, it is desired to provide the rear upper portion of the tractor body with a space for installing various devices including a travelling brake, a tool box and a fuel tank. However, since the travelling transmission case 5' is connected directly to the differential transmission case 6', such space cannot be assured.

SUMMARY OF THE INVENTION

It is an object of the present invention to provide an agricultural tractor in which the lowest level at the intermediate portion of the tractor body is located at a position sufficiently high from the ground, and wherein a space is provided at the rear portion of the tractor body for installing various devices including a travelling brake and a tool box, etc.

In order to achieve such object, an agricultural tractor in accordance with the present invention includes an engine mounted at the front of the tractor body and having an output shaft disposed in the front-rear direction of the tractor body, a travelling transmission case to which output of said engine is transmitted through a shaft, a differential transmission case for driving the rear wheels and a speed reduction case for driving the rear wheels, said three cases being mounted at the rear of the tractor body, and is characterized in that said speed reduction case is formed in a vertically long shape with the upper front portion thereof connected to said travelling transmission case and the lower rear portion thereof connected to said differential transmission case.

According to the present invention, provision is made such that the rear wheels are supported at positions sufficiently lower than the travelling transmission case. This enables the lowest level at the intermediate portion of the tractor body to be located at a position sufficiently high from the ground, as compared with a conventional tractor shown in FIG. 7 where the differential transmission case for the rear wheels 6' and the speed reduction cases for driving the rear wheels 7' are connected to the travelling transmission case 5' on the substantially same level in the front-rear direction of the tractor body. Such arrangement of the present invention therefore provides an advantage that a mid-mount type working machine of every kind can be easily mounted to the tractor.

Furthermore, according to the present invention, the travelling transmission case and the differential transmission case for driving the rear wheels are distributingly disposed respectively at the upper and front side and at the lower and rear side with respect to the speed reduction case, so that the rear wheels can be supportingly located at positions sufficiently lower than the travelling transmission case. Such arrangement enables to simplify the conventional structure as shown in FIG. 7 which requires a pair of speed reduction cases and a pair of transmission gears. Thus, a relatively lightweight tractor can be manufactured, thereby to advantageously reduce the stamping of the grass.

Other objects and advantages of the present invention will be apparent from the following description.

BRIEF DESCRIPTION OF THE DRAWINGS

The present invention will be further described, by way of example, with reference to the accompanying drawings, in which:

FIG. 2 is a longitudinal section view of the speed reduction case mounting portion in FIG. 1;

Description of the Preferred Embodiments

Figure 1:
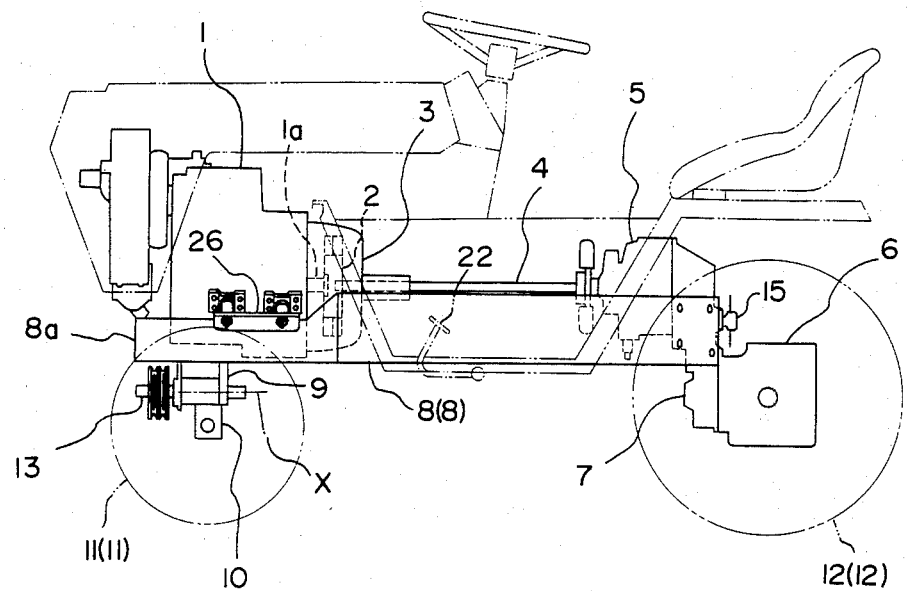
FIG. 1 is a side view of an agricultural tractor in accordance with the present invention.
Figure 5:
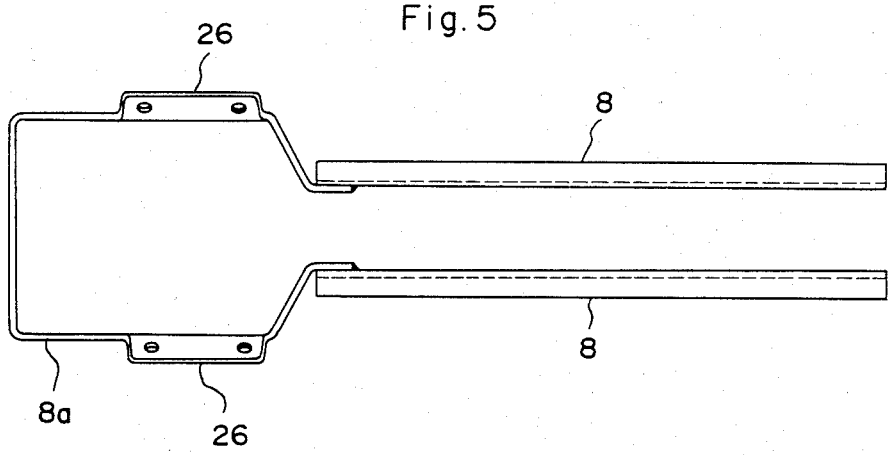
FIG. 5 is a plan view of main frames.
Figure 7:
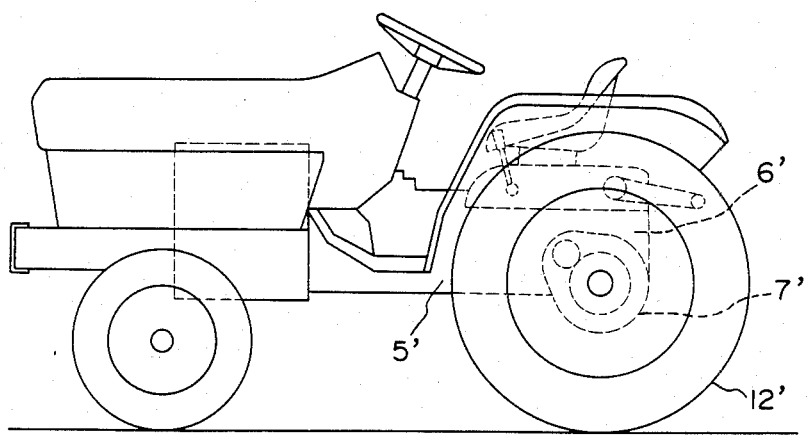
FIG. 7 is a side view of a conventional agricultural tractor.

As shown in FIG. 1, a tractor is provided at the front thereof with an engine 1 having an output shaft 1a disposed in the front-rear direction of the tractor body. Connected to the rear portion of the engine 1 is a clutch housing 3 incorporating a travelling transmission clutch means of the disk type 2. Disposed at the rear portion of the tractor body is a travelling transmission case 5 incorporating a HST (hydro-static transmission) (not shown) interlockingly connected to the transmission clutch means 2 through a transmission shaft 4 disposed in the front-rear direction of the tractor body. Also disposed at the rear portion of the tractor body is a differential transmission case for driving the rear wheels 12 and a speed reduction case 7 for driving the rear wheels 12. These cases 5, 6 and 7 are connected to each other in a manner discussed later. There are disposed a pair of main frames 8 each having a substantially C-shape section for connecting the engine 1 to the speed reduction case 7. As shown in FIG. 5, these main frames 8 are connected at the tip ends thereof to an engine mounting U-shape frame 8a. A supporting frame 10 is pivotally connected to a bracket 9 which is rigidly connected to the front ends of the main frames 8, such that the supporting frame 10 is swingable about the front-rear directional axis X. Left and right front wheels 11 are respectively mounted to the left and right ends of the front wheel support frame 10 such that the front wheels 11 can be changed in direction. Left and right drive rear wheels 12 are mounted to the respective lateral sides of the differential transmission case for driving the rear wheels 6. Attached to the bracket 9 is a power-take-off shaft 13 for driving an attachment such as a mower to be attached to the front or the lower portion of the tractor body. It is to be noted that the power-take-off shaft 13 simultaneously forms a pivot pin for the front wheel supporting frame 10. With such arrangement, the attached working machine performs an operation with the advancement of the tractor body.

As shown in FIGS. 1 and 2, the speed reduction case 7 is formed in the vertically long shape with the upper front portion thereof connected to the travelling transmission case 5 and the lower rear portion thereof connected to the differential transmission case 6. Disposed inside the speed reduction case 7 are a first transmission shaft 15 interlocked, through gears, with the output shaft 14 of the travelling transmission case 5, gears 17a and 17b for interlocking, in a speed reduction manner, the first transmission shaft 15 with a second transmission shaft 16, and gears 19a and 19b for interlocking, in a speed reduction manner, the second transmission shaft 16 with the drive shaft 18a of a differential transmission gear for driving the rear wheels 18.

In the space defined by the rear side of the upper portion of the speed reduction case 7 and the top surface of the differential transmission case 6, there is fittingly disposed a travelling brake 20 adapted to brake the rear wheels 12, which acts on the first transmission shaft 15 supported as projected from the upper rear side of the speed reduction case 7.

Figure 3:
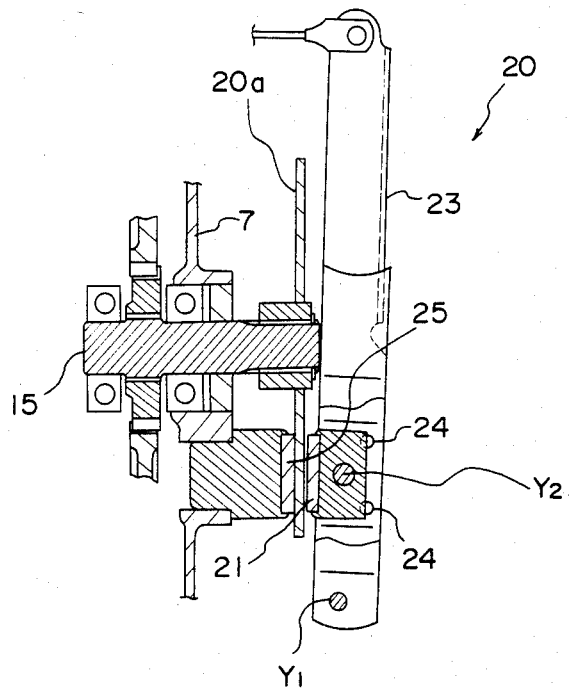
FIG. 3 is a side view, with portions broken away, of a travelling brake in FIG. 1.
Figure 4:
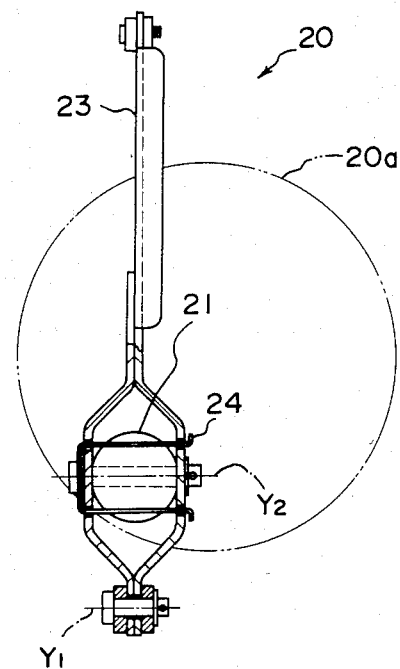
FIG. 4 is a schematic rear view of the brake in FIG. 3.

As shown in FIGS. 2 to 4, a disk 20a is splined and slidably connected to the first transmission shaft 15. A braking pad 21 adapted to act on the side surface of the disk 20a is pivotally supported by a lever 23 in a manner swingable around an axis Y2 substantially parallel with a swing axis Y1 of the lever 23, the lever 23 being swingingly operable by a pedal 22 ( FIG. 1) such that the braking pad 21 is moved toward and away from the side surface of the disk 20a. The lever 23 has a spring or resilient rod 24 turned in the U-shape to urge the braking pad 21 to reset to the predetermined swing position. The speed reduction case 7 has a fixed pad 25 for receiving the disk 20a. Thus, when the lever 23 is swung toward the disk 20a, the braking pad 21 is accordingly swung toward and along the side surface of the disk 20a, thereby to come in contact therewith, whereby a braking action is provided.

Figure 6:
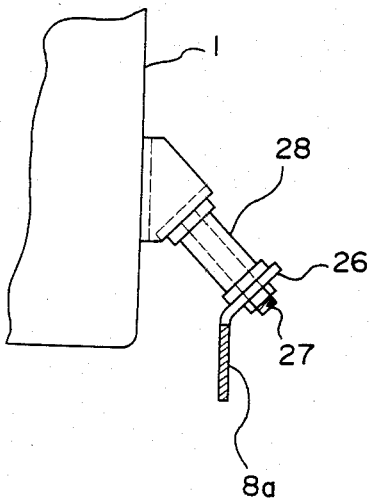
FIG. 6 is a front view of an engine mounting portion.

As shown in FIGS. 1, 5 and 6, the U-shape frame 8a has engine mounting tongue pieces 26. The lower end of the engine 1 is mounted to the U-shape frame 8a of the main frames 8 by attaching bolts 27 secured to the engine lower end, to the tongue pieces 26 through cylindrical resilient members 28. Thus, engine vibration is hardly transmitted to the tractor body.

The present invention may be embodied with a gear transmission incorporated in the travelling transmission case 5.

Moreover, the frame structure may be variously modified. For example, the engine 1 may be connected to the travelling transmission case 5 through a transmission case covering the transmission shaft.

We claim:

1. An agricultural tractor having front and rear wheels comprising:
    an engine mounted at a front portion of the tractor;
    a travelling transmission case mounted at a rear portion of the tractor and having an output shaft extending rearwardly therefrom;
    differential case means for driving the rear wheels and for housing a differential drive shaft;
    a driver's seat disposed above said differential case means; and
    an elongated vertically oriented speed reduction case means for driving the rear wheels, said speed reduction case means operatively mounted between said travelling transmission case and said differential case means, said speed reduction case means housing a rear portion of said output shaft, a first transmission shaft, a second transmission shaft and a portion of said differential drive shaft;
    said output shaft, first and second transmission shafts and differential drive shaft each being arranged substantially vertically and serially;
    said first transmission shaft including a portion extending rearwardly from said speed reduction case means and including brake means for braking said rearwardly extending portion of said first transmission shaft;
    wherein said travelling transmission case, speed reduction case means and differential case means are rigidly interconnected by means defining a space between the front wheels and said differential case means for accommodating an implement therein; and
    wherein said brake means includes a disc mounted on the rearwardly extending portion of said first transmission shaft and lever means having an elongated shape to apply a braking force to the disc, said brake means having a small dimension longitudinally of the tractor to define a utility space rearwardly of the brake means between the differential case means and the driver's seat for accommodating varied devices.

2. An agricultural tractor as in claim 1 wherein said brake means includes:
    means to mount said disc in splined connection with said rearwardly extending portion of said first transmission shaft;
    an inner disc pad rigidly fixed to said speed reduction case means and defining a first planar pad surface to coact with one surface of said disc;
    lever means mounted for pivotal movement about a first axis so as to be pivotal between released and braked positions, said lever means including an outer disc pad pivotally mounted to said lever member so as to be pivotally moveable around a second axis substantially parallel to said first axis, said second disc pad defining a second planar pad surface to coact with another surface of said disc opposite to said one surface; and
    a manually operable brake member operatively connected to said lever means, said lever means for pivoting from said released position to said braked position in response to manual operation of said brake member, said second disc pad thereby pivoting about said second axis due to said pivotal mounting thereof to said lever means to pivotally move said second planar pad surface between an angular disengaged orientation relative to said another surface of said disc and a parallel engaged orientation relative to said another surface of said disc, said second disc pad capturing said disc between said first and second planar pad surfaces to impart braking action thereto when in said parallel engaged orientation.

3. An agricultural tractor as in claim 2 further comprising right and left frame members to interconnect said speed reduction case means and said engine.

4. An agricultural tractor comprising in combination:
a frame;
an engine mounted to said frame and including an output shaft extending longitudinally of the tractor to provide driven force;
front and rear pairs of wheels journally mounted to said frame to support the tractor for rolling movement across a surface;
force transmission means having a first transmission shaft rearwardly longitudinally extended therefrom and operatively interconnecting said output shaft and said rear pair of wheels to transmit driven force from said engine to said rear pair of wheels to propel said tractor across a surface; and
braking means to brake the driven force, said braking means including (a) a disc in splined connection with a portion of said first transmission shaft and defining a pair of opposing planar disc surfaces; (b) an inner disc pad rigidly fixed to said transmission means, said inner disc pad defining a first planar disc pad surface engageable with a first one of said pair of opposing planar disc surfaces; (c) an outer disc pad defining a second planar disc pad surface engageable with a second one of said pair of disc surfaces; and (d) lever means pivotally mounted to said frame about a first pivot axis and manually operable to pivot said lever means between said released and braked positions, said lever means including mounting means to pivotally mount said outer disc pad to said lever means, said outer disc pad pivoting about a second pivot axis substantially parallel to said first pivot axis between (i) a disengaged position wherein said second planar disc pad surface is disengaged in angular alignment relative to said second one of said pair of disc surfaces, and (ii) an engaged position wherein said second planar disc pad surface is engaged in parallel alignment with said second one of said pair of disc surfaces, said lever means for effecting pivotal movement of said outer disc pad between said disengaged and engaged positions about said second pivot axis to cause said second planar disc pad surface to pivotally move from said disengaged angular alignment to said engaged parallel alignment relative to said second one of said pair of opposing planar disc surfaces and for forcing said first one of said pair of opposing planar disc surfaces into engagement with said first planar disc pad surface in response to said lever means being manually pivotally moved about said first pivot axis from said released position to said braked position whereby braking of said driven force is effected.

5. An agricultural tractor as in claim 4 wherein said lever means includes biasing means for biasing said outer disc pad into said disengaged position when said lever means is in said released position.

6. An agricultural tractor as in claim 5 wherein said biasing means includes a U-shaped spring member having upper and lower legs in respective engagement with upper and lower portions of said outer disc pad to cause said outer disc pad to pivot about said second pivot axis so that said outer disc pad is reset to said disengaged position when said lever means is in said released position.

* * * * *